US007136722B2

(12) United States Patent
Nakamura et al.

(10) Patent No.: US 7,136,722 B2
(45) Date of Patent: Nov. 14, 2006

(54) METHOD FOR GENERATING A MOTION OF A HUMAN TYPE LINK SYSTEM

(75) Inventors: Yoshihiko Nakamura, Edogawa-ku (JP); Katsu Yamane, Kawagoe (JP); Manabu Tange, Kita-ku (JP)

(73) Assignee: The University of Tokyo, Tokyo (JP)

( * ) Notice: Subject to any disclaimer, the term of this patent is extended or adjusted under 35 U.S.C. 154(b) by 0 days.

(21) Appl. No.: 10/360,873

(22) Filed: Feb. 10, 2003

(65) Prior Publication Data

US 2003/0220714 A1    Nov. 27, 2003

(30) Foreign Application Priority Data

Feb. 12, 2002  (JP) ............................. 2002-034535

(51) Int. Cl.
    *G06F 19/00*    (2006.01)
(52) U.S. Cl. ................. 700/245; 700/257; 700/258; 700/259; 700/260; 700/263; 700/264; 318/568.1; 318/568.11; 318/568.16; 318/568.12; 318/568.24; 901/6; 901/9; 901/29; 901/34; 901/1; 180/8.6
(58) Field of Classification Search ............... 700/245, 700/257–260, 263–264; 318/568.1, 568.11, 318/568.16, 568.53, 568.24; 901/6, 9, 29, 901/34; 200/341
    See application file for complete search history.

(56) References Cited

U.S. PATENT DOCUMENTS

| | | | | |
|---|---|---|---|---|
| 5,276,390 A | * | 1/1994 | Fisher et al. ............. | 318/568.1 |
| 5,377,310 A | * | 12/1994 | Jain et al. ................. | 700/260 |
| 5,644,204 A | * | 7/1997 | Nagle ..................... | 318/568.12 |
| 5,731,821 A | * | 3/1998 | Girard ..................... | 345/474 |
| 5,808,433 A | * | 9/1998 | Tagami et al. ........... | 318/568.12 |
| 5,872,893 A | * | 2/1999 | Takenaka et al. ........ | 700/245 |
| 5,915,073 A | * | 6/1999 | Maeda ..................... | 700/245 |
| 6,057,620 A | * | 5/2000 | Chen et al. .............. | 310/90.5 |
| 6,104,412 A | * | 8/2000 | Tsutsuguchi et al. ... | 345/473 |
| 6,144,385 A | * | 11/2000 | Girard ..................... | 345/473 |
| 6,463,356 B1 | * | 10/2002 | Hattori et al. ........... | 700/245 |
| 6,505,096 B1 | | 1/2003 | Takenaka et al. | |

FOREIGN PATENT DOCUMENTS

| | | |
|---|---|---|
| JP | A 5-84679 | 4/1993 |
| JP | A-10-230485 | 9/1998 |
| JP | A 2001-242435 | 9/2001 |

OTHER PUBLICATIONS

Murphy et al., Silulatin of cooperatiting robot manipulators on a mobile platform, 1991, IEEE, pp. 468-478.*
Yanai et al., Feed back control of crane based on inverse dynamics calcualtion, 2001, IEEE, pp. 482-487.*

(Continued)

*Primary Examiner*—Thomas G. Black
*Assistant Examiner*—McDieunel Marc
(74) *Attorney, Agent, or Firm*—Oliff & Berridge PLC

(57) ABSTRACT

A human-type link system, such as a humanoid robot having a dynamically feasible motion of the link system that is generated when a reference joint acceleration that is only calculated from a kinematical constraint condition is determined not feasible by an evaluation of external force computed based on an inverse dynamics calculation, or is generated by calculating from a dynamic constraint condition and a kinematical constraint condition simultaneously, the dynamic constraint condition is formulated by using an actuation space inverse inertial matrix that represents the relation of force acting on the link system and the acceleration of the link system caused by the force.

9 Claims, 4 Drawing Sheets

OTHER PUBLICATIONS

Hollerbach et al., Wrist-partitioned inverse kinematic accelerations and manipulator dynamics, 1984, IEEE, pp. 152-161.*

Ogata et al., Emotion communicatoin robot: WAMOEBA-2R—Emotion model and evalulation experiments, 1999, Internet, pp. 1-16.*

Park et al., Biped robot walking using gravity-compensated inverted pendulum mode and computed torque control, 1998, IEEE, p. 3528-3533.*

Anirvan Dasgupta et al.; Making Feasible Walking Motion of Humanoid Robots From Human Motion Capture Data; IEEE; May 1999; pp. 1044-1049.

Koichi Nishiwaki et al.; Online Mixture and Connection of Basic Motions for Humanoid Walking Control by Footprint Specification; IEEE; May 2001; pp. 4110-4115.

Katsu Yamane et al.; Dynamics Filter-Concept and Implementation of On-Line Motion Generator for Human Figures; IEEE; Apr. 2000; pp. 688-694.

Qiang Huang et al.; Balance Control of A Biped Robot Combining Off-Line Pattern With Real-Time Modification; IEEE; Apr. 2000; pp. 3346-3352.

Multon F. et al., "Computer Animation of Human Walking: A Survey", Journal of Visualization and Computer Animation, vol. 10, No. 1, Jan. 1999, pp. 39-54.

Ko H. et al., "Animating Human Locomotion with Inverse Dynamics", IEEE Computer Graphics and Applications, IEEE Service Center, New York, NY, vol. 16, No. 2, Mar. 1996, pp. 50-59.

Isaacs P. M. et al., "Controlling Dynamic Simulation With Kinematic Constraints, Behavior Functions and Inverse Dynamics", Siggraph '87 Conf Proc, vol. 21, No. 4, Jul. 1987, pp. 215-224.

Lilly K. W. et al., "Efficient O(N) Computation of the Operational Space Inertia Matrix", IEEE Transaction on Systems, Man and Cybernetics, vol. 23, No. 5, Sep. 1993, pp. 1384-1391.

* cited by examiner

METHOD FOR GENERATING A MOTION OF A HUMAN TYPE LINK SYSTEM

BACKGROUND OF THE INVENTION

1. Field of the Invention

The present invention relates to a method for generating dynamically feasible motion of a link system having a human-like construction. This method can be used for motion generating software for a humanoid robot, a real time control system for a humanoid robot and a motion generating software for computer graphics.

2. Description of Related Art

Human models in computer graphics (CG) and humanoid robots have a significant unbalanced motion caused by bipedal locomotion, so that feasible motion is limited by contact force from an environment such as a floor, and a torque generated at a joint. Therefore, in such a humanoid, if a feasible motion can be generated previously, control for an actual humanoid robot there will readily be achieved. Moreover, in the field of CG animation, there will easily effect the artificial animation by generating a physically nonartificial motion automatically.

For example, at a motion generating of humanoid robot, there will have a large merit if the motion will be ensured to be realized dynamically for an ideal model, the control of the motion is facilitated. However, since many humanoid robot has a number of joints, there are problems such as a complexity of operation caused from variables to deal with, difficulty of real time processing caused by means of too many calculated amount.

There have been proposed many prior arts, for example, a method to adjust parameters to realize the motion dynamically by representing the motion as function (Q. Huang, K. Kaneko, K. Yokoi, S. Kajita, and T. Kotoku: "Balance Control of a Biped Robot Combining Off-line Pattern with Real-time Modification", Proceedings of International Conference on Robotics and Automation, pp.3346–3352, 2000. and K. Nishiwaki, T. Sugihara, S. Kagami, M. Inaba, and H. Inoue: "Online Mixture and Connection of Basic Motions for Humanoid Walking Control by Footprint Specification", Proceedings of IEEE International Conference on Robotics and Automation, pp. 4110–4115, 2001.), a method for generating dynamically feasible motion based on motion capture data (K. Yamane and Y. Nakamura: "Dynamics Filter— Concept and Implementation of On-Line Motion Generator for Human Figures", Proceedings of IEEE International Conference on Robotics and Automation, pp.688–695, 2000. and A. DasGupta and Y. Nakamura: "Making Feasible Walking Motion of Humanoid Robots from Human Motion Captured Data", Proceedings of International Conference on Robotics and Automation, pp.1044–1049, 1999.).

However, these methods have the following problems:
(1) Generating only particular kinds of motion
(2) Motion becomes artificial
(3) Calculation time is too long
(4) Difficult to adjust parameters
(5) Needs reference motion data
(6) Non-interactive Japanese patent application number 2001-242435 "Method for Generating Pose and Motion of link System with Tree Construction" invented by the same inventors as of this invention and filed by the same applicant as this application as a relative invention of this invention discloses a method, which is able to generate motion without reference data. However, this method does not regard dynamics of motion of the link system, so there is possibility to generate a physically improbable motion.

It is therefore an objective of the present invention to provide a method for generating motion of a link system, this method achieves to generate a motion interactively where the motion is realized by a human type link system such as a human model with a large number of degrees of freedom or a humanoid robot. Specifically, the objective of this invention is to provide a method which achieves that one or more of a human type link system designated by an operator moves on a trajectory given by any interface satisfying a dynamic constraint condition as follows:

(A) Fixing absolute position of link
(B) Joint value does not deviate from its predetermined movable region
(C) Joint value comes close to predetermined object value as much as possible, and that generates a whole body motion of the link system, which the system is feasible dynamically. At this point, the term "feasible dynamically" means that the motion can be executed by the driving force of a joint and contact force acted from an environment around the link system, such as a floor.

SUMMARY OF THE INVENTION

A method for generating motion of human type link system of this invention which achieves advantageously the above-mentioned object that is described in claim 1 characterized in that dynamically feasible motion of the link system is generated when a reference joint acceleration that is only calculated from a kinematical constraint condition is determined and that it is not feasible by an evaluation of external force computed based on an inverse dynamics calculation.

A method for generating a motion of human type link system of this invention which achieves advantageously the above-mentioned object that is described in claim 2 characterized in that dynamically feasible motion of the link system is generated by calculating from a dynamic constraint condition and a kinematical constraint condition simultaneously, the dynamic constraint condition is formulated by using an actuation space inverse inertial matrix that represents the relation of force acted on the link system and the acceleration of the link system caused by said acceleration.

More specifically, this invention provides a motion generating engine, and this engine outputs feasible motion of a link system with a joint construction like humans in real time when a dynamic constraint condition and one or more trajectories are input sequentially. FIG. 1 shows an embodiment of a configuration of a motion-generating system for a humanoid robot using the motion-generating engine according to this invention. This system comprises said motion generating engine constituted from a computer, in addition, links for fixing (it cannot move because of grasping object fixed in its environment), a movable region of joint, and interface for set object value of joint, and this engine enables to designate a particular trajectory of link of robot by using a joystick or other similar input devices. The information designated by an operator is input to the engine, and a generated motion is output to the robot. On the other hand, the current condition of the robot is returned to the engine, and is used to generate a motion of the next step.

This engine generates motion of the robot which satisfies kinematical constraint condition given by external of the robot and dynamic constraint condition given by mass property of model, using either one of following two methods:

(a) Method based on an inverse dynamics calculation:
Calculate once the ideal motion by the dynamic constraint condition, then determine whether the motion is feasible dynamically or not by contact force derived from a calculation based on an inverse dynamics calculation. If the motion is not feasible, correct the motion to be feasible.

(b) Method using an actuation spatial inverse inertial matrix:
Derive a constraint condition that includes the affection from a force that acts between links by using the actuation spatial inverse inertial matrix that represents the relation of force acted on a certain link in the link system and the acceleration of the link caused by said acceleration, then derive the motion to calculate the matrix and the dynamic constraint condition simultaneously.

According to such a method and motion generating system, since the dynamic feasible motion is generated only by giving a dynamic constraint condition, which is easier to understand intuitively than the above-mentioned related invention "Method for Generating Pose and Motion of Link System with Tree Construction". So the whole body motion of human type link system is provided by a simple interface and interactively. And using fast algorithm to execute dynamic calculation, a motion of the human type link system can be generated in near real-time processing time.

DETAILED DESCRIPTION OF THE PREFERRED EMBODIMENT

Figure 1:
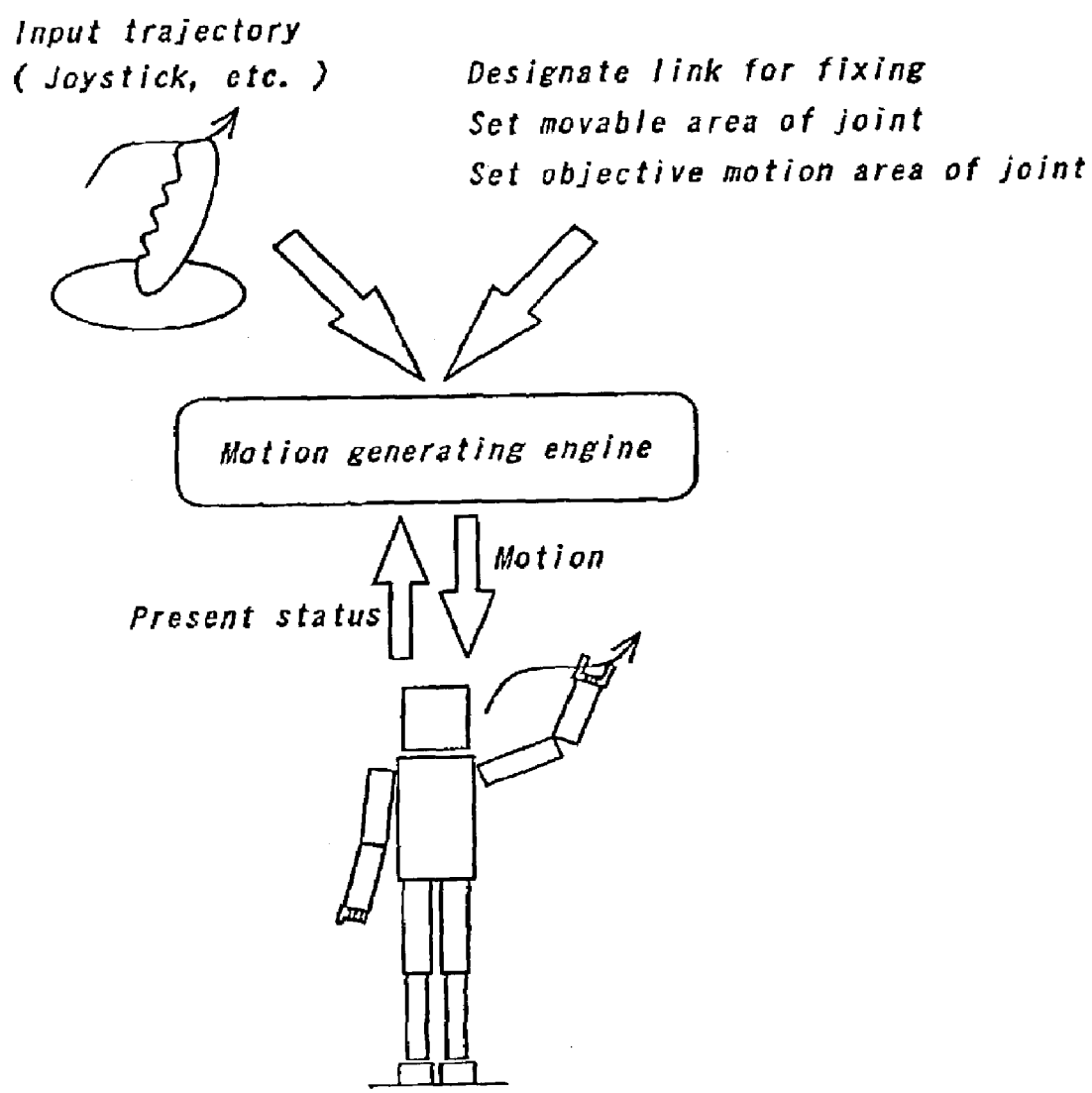
FIG. 1 is a schematic diagram of an embodiment of configuration of a motion-generating system for a humanoid robot using the motion-generating engine according to this invention.
Figure 2:
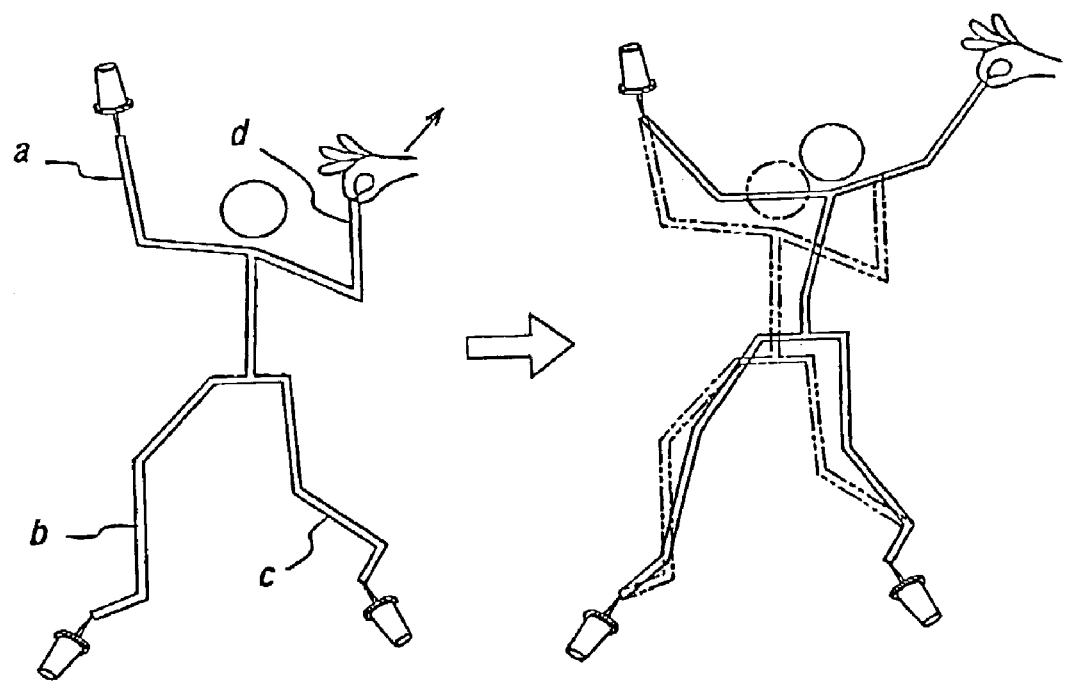
FIG. 2 is a schematic diagram of an outline of "Method for Generating Pose and Motion of Link System with Tree Construction" the relative invention which forms of the interface uses in the method for generating a motion of a human type link system of this invention.

The present invention will be further explained below with reference to a preferred embodiment shown in the accompanying drawings. At first, an outline of "Method for Generating Pose and Motion of Link System with Tree Construction", the relative invention whose interface is also used for generating a motion of human type link system in this invention, will be explained. As shown in FIG. 2, in this method, as some of the links in the human type link system (link a, b, c in FIG. 2) are fixed in the space and trajectory of other link (link d in FIG. 2) is designate, whole body motion of robot which the robot moves on the designated trajectory with satisfying the constraint condition of fixed links. In this method, it is also possible to give the robot to not only position of the link but also constraint condition of work space of joint or reference value of joint. However, since this method only takes account of kinematical constraint condition, dynamically infeasible motion may be generated.

In this invention, dynamic feasible motion is generated by taking account of not only kinematical constraint condition as the above-mentioned relative invention, but also dynamic constraint condition such as mass of the link, moment of inertia, torque of joint, and contact force. There are following two method to calculate dynamic constraint condition:

(A) Method based on inverse dynamics calculation
(B) Method by using actuation space inverse inertial matrix Detail of these methods will be described thereinafter.

(A) Method Based on Inverse Dynamic Calculation

This method realizes fast calculation by inverse dynamic calculation with relatively high computing speed and without using dynamic calculation with time-consuming computation. Calculating steps of this method are as follows:

(a) Calculate objective joint acceleration necessary to satisfy kinematical constraint condition. That is, as above-mentioned method of the relative invention which is only accounting kinematical constraints, calculate joint acceleration which is to be generated at each of joints of the robot from the difference between present status of each joint and the constraint conditions.

(b) Calculate external force acted from the environment of the robot, such as floor. This force is the factor that is need for generating the reference joint acceleration derived from step (a), so this force is calculated by inverse dynamic calculation. In order to calculate the force needs for generate objective joint acceleration, method of inverse dynamic calculation such as Newton-Euler method.

(c) Check the external force calculated in step (b) whether this force is valid as a contact force. The criterion of validity has the following three check points:

(1) Is the vertical direction force function as a repulsive force? Because the contact force cannot act on the link as pulling force directed to the floor.

Figure 3:
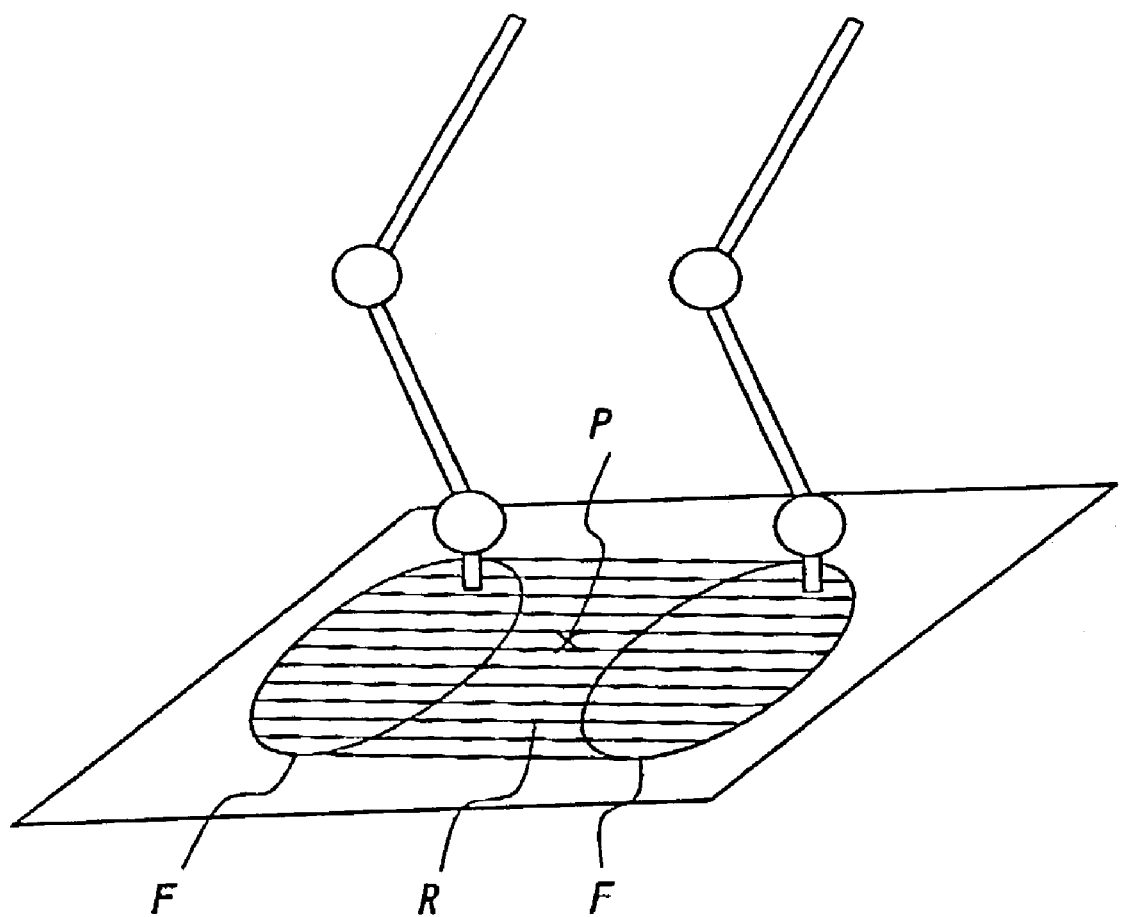
FIG. 3 is a schematic diagram of the method for determine that the pressure center point exist whether in convex hull of the contact region or not in the method of this invention.

(2) Is a pressure center point existing in the convex hull of the contact region? As shown in FIG. 3, this pressure center point needs to be included within the convex hull R in the contact region of both bottoms of feet F faced on the floor. In addition, the term "convex hull" is defined as the minimum convex polygon including the Contact region and here means the area enclosed by both bottoms of feet of a robot, the virtual line drawn between both of the toes and between both of the heel.

(3) Is the frictional force less or equal to the maximum static frictional force (at non-slip condition)? In order to maintain a non-slip condition, this frictional force needs to be less or equal to the maximum static frictional force derived from multiplying the vertical reaction force and the coefficient of static friction.

(d) If the external force is determined to be valid as a reaction force in step (c), the reference joint acceleration is employed directly as the joint acceleration.

(e) If the external force is determined to be invalid as a reaction force in step (c), recalculate the external force to derive a new valid value of the external force which is nearest to the pre-calculated value and has validity, then, execute the above step (a) to add a new constraint condition so that the value of the external force substitutes to the new corrected value. Subsequently, the recalculated reference joint acceleration under the new constraint condition is employed directly as a new joint acceleration.

Corrective calculation of the external force is executed by the following procedures:

(1) If the vertical direction force has direction to pull the link, this force sets zero.

(2) If a pressure center point exists out of the convex hull of the contact region, set the nearest point in the convex hull as a new pressure center point.

(3) If the frictional force is larger than maximum static frictional force allowed in the same direction as the frictional force, this maximum static frictional force sets as a new frictional force.

If the corrected external force is represented by the vector $$f_c,$$

so the constraint condition which joint acceleration $$\ddot{q}$$

should be satisfy is represented by following equation:

$$M_b \ddot{q} + c_b = J_{cb}^T \hat{f}_c.$$

In this equation, $M_b$, $c_b$, $J_{cb}$ respectively represents the inertial matrix of human type link system, velocity and gravity term and coordinate conversion matrix of contact point. $M_b$ and $c_b$ can be calculated quickly by executing inverse dynamic calculation repeatedly.

(f) Obtain joint angle and joint velocity by means of integral calculation of the joint acceleration derived from above step (d) or step (e).

(B) Method by Using Actuation Space Inverse Inertial Matrix

This method utilizes an actuation space inverse inertial matrix, which represents the relation between force acted on the reference link in a human type link system and the motion of the link. This matrix can be calculated quickly by using the method disclosed in Japanese patent application number 2001-242435 "Method for Generating Pose and Motion of Link System with Tree Construction" which is invented by the same inventor as this application. Calculating steps of this method are as follows:

(a) Calculate Actuation Space Inverse Inertial Matrix

Figure 4:
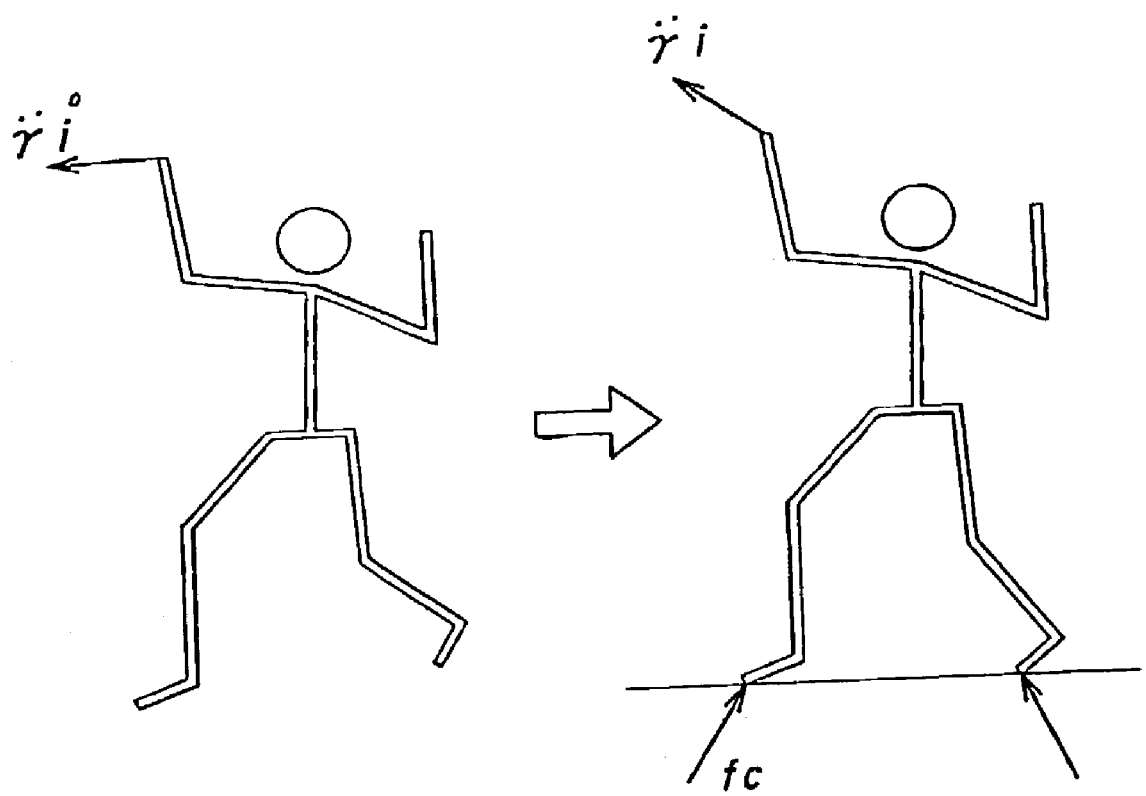
FIG. 4 is a schematic diagram of contact force and link acceleration, calculation of an actuation spatial inverse inertial matrix based on this force and acceleration in the method of this invention.

An actuation space inverse inertial matrix represents the relation between the contact force and the link acceleration consequently generated by the force as shown FIG. 4.

That is, if the actuation space inverse inertial matrix is represented by the symbol $$\Lambda_i,$$

so the relation in the acceleration before taking account of the contact $$\ddot{r}_i^o,$$

the acceleration after taking account of the contact $$\ddot{r}_i,$$

and the contact force $f_c$ is formed by this equation:

$$\ddot{r}_i = \Lambda_i f_c + \ddot{r}_i^o.$$

This matrix can be calculated by using the method disclosed in Japanese patent application number 2001-242435.

(b) Calculate matrix which represents the relation between the joint acceleration and the acceleration of the constrain point when it is not took account for contact. The acceleration $\ddot{r}_i^o$ which was utilized in above step (a) is varied by the inertial force caused by the motion of the joint. Matrix $\Phi_i$ used in following equation is represented as the relation of the acceleration $\ddot{r}_i^o$ and the joint acceleration $\ddot{q}$:

$$\ddot{r}_i^o = \Phi_i \ddot{q} + \phi_i.$$

The symbol $\Phi_i$ represents the acceleration of link no. i in the link system when the joint acceleration is zero.

(c) Calculate contact force from such as floor assuming a spring and a dumper exists in the contact point. As depth of plunging in contact point m represents $d_m$ and the velocity of plunging represents $u_m$, the contact force $f_m$ is calculated from the following equation.

$$f_m = k_s d_m + k_D u_m$$

In this equation, $k_s$, $k_D$ means coefficient of spring and dumper respectively. As work out the sum of $f_m$ at all of the contact point, total contact force $f_c$ is obtained.

(d) Using two matrices calculated at step (a) and (b) and the contact force calculated at step (c), an equation will be derived. This equation represents the relation of the joint acceleration, the link given its trajectory and link acceleration which the link is constrained at its absolute position.

That is, by the parameter $\ddot{r}_i^o$ is eliminated from equation at step (a) and (b) respectively and subedit the equations, the following equation is derived.

$$\Phi_i \ddot{q} = \ddot{r}_i - \Lambda_i f_c - \phi_i \quad (1)$$

This equation gives the relation of $\ddot{r}_i$ and $\ddot{q}$.

With regard to the link with constrained position and the link having its trajectory, since the objective acceleration of these links $$\ddot{r}_i^d$$

is already calculated, so the equation $$\Phi_i \ddot{q} = \ddot{r}_i^d - \Lambda_i f_c - \phi_i,$$

which $\ddot{r}_i$ is substituted to $\ddot{r}_i^d$ in the foregoing equation (1) is the constraint condition regarding dynamics.

(e) Resolving simultaneous equation of the equation in step (d) and the equation of the other dynamic constraint condition such as objective joint values, the joint acceleration is derived.

With regard to work space of joint and reference joint values, reference acceleration is given as $$\ddot{r}^d$$

Resolving this value and the constraint condition of step (d) simultaneously, the joint acceleration which satisfies both kinematical constraint condition and dynamic constraint condition are obtained.

(f) Obtain joint angle and joint velocity from integral calculation of the equation which is derived in step (e).

The invention claimed is:

1. A method for generating a motion in a link system of a mechanical model of human or humanoid motion or a virtual model of human or humanoid motion, comprising,
    (a) a step of calculating a reference joint acceleration of the link system only from a kinematic constraint condition;
    (b) a step of calculating external force that is needed for generating the reference joint acceleration, by inverse dynamic calculation from the reference joint acceleration derived from step (a);
    (c) a step of evaluating a feasibility of the reference joint acceleration, by checking whether the external force calculated in step (b) is valid as a contact force;

(d) a step of employing directly the reference joint acceleration as a joint acceleration of the link system when the external force is determined to be valid as a reaction force in step (c);

(e) a step of recalculating, when the external force is determined to be invalid as a reaction force in step (c), the external force to derive a new valid value of the external force, then, executing the steps (a) to (c) to add a new constraint condition so that the value of the external force substitutes to the new valid value;

wherein steps (a) to (e) are exerted by a computer; and the new valid value of the external force is calculated in step (e) by;

setting the external force zero, when the vertical direction force has direction to pull the link;

setting the nearest point in a convex hull of a contact region of the link system as a new pressure center point, when a pressure center point of the external force exists out of the convex hull;

setting a maximum static frictional force as a new frictional force by the external force, when a frictional force by the external force is larger than the maximum static frictional allowed in the same direction as the frictional force.

2. The method of claim 1, wherein the external force is computed based on an inverse dynamics calculation.

3. A method for generating a motion in a link system of a mechanical model of human or humanoid motion or a virtual model of human or humanoid motion, comprising, a. a step of calculating an actuation space inverse inertial matrix which represents a relation between contact force acted on a reference link of the link system and a link acceleration of the reference link;

b. a step of calculating a matrix which represents a relation between a joint acceleration and an acceleration of a constraint point when a contact is not taken into account;

c. a step of calculating contact force from a contact point assuming a spring and a dumper exists in the contact point;

d. a step of deriving, using two matrices calculated at step (a) and step (b) and the contact force calculated at step (c), an equation which represents a relation of a joint acceleration and a link acceleration of a link given its trajectory and a link constrained at its absolute position;

e. a step of resolving simultaneous equation of the equation in step (d) and equations of another dynamic constraint condition to derive the joint acceleration; and f. a step of determining joint angle and joint velocity from integral calculation of the joint acceleration which is derived in step (e); wherein steps (a) to (f) are exerted by a computer.

4. The method of claim 3 wherein the another dynamic constraint condition is formulated by using an actuation space inverse inertial matrix.

5. The method of claim 4, wherein the actuation space inverse inertial matrix represents a relationship of a force acting on the link system and an acceleration of the link system caused by the force.

6. A robot having a link system of a mechanical model of human or humanoid motion, the robot comprising:

a motion generating engine, wherein the engine generates motion according to the method of claim 1.

7. The robot of claim 6, wherein the engine generates dynamically feasible motion by determining a value of a dynamic constraint condition and determining a value of a kinematical constraint condition.

8. The robot of claim 7, wherein the dynamic constraint condition is formulated by using an actuation space inverse inertial matrix.

9. The robot of claim 8, wherein the actuation space inverse inertial matrix represents the relationship of the force acting on the link system and the acceleration of the link system caused by the force.

* * * * *